United States Patent Office 3,063,944
Patented Nov. 13, 1962

3,063,944
METHOD OF CHEMICALLY MILLING MAGNESIUM
Hyman W. Zussman, Scarsdale, and Robert M. Pines, Spring Valley, N.Y., assignors to Geigy Chemical Corporation, Ardsley, N.Y., a corporation of Delaware
No Drawing. Filed Oct. 26, 1959, Ser. No. 848,515
7 Claims. (Cl. 252—79.1)

This invention relates to the use of organic chelating agents as chemical milling agents for magnesium. In particular, the use of ethylenediaminetetraacetic acid (EDTA) and of its alkali metal and amine salts has been found to be advantageous. In addition, diethylene triaminepentaacetic acid (DTPA) and hydroxyethylethylenediaminetriacetic acid (HEEDTA) as well as their alkali metal and amine salts are effective chemical milling agents for magnesium. Further, cyclohexanediaminetetraacetic acid, diaminodiethylethertetraacetic acid and N-(2-hydroxycyclohexyl)-ethylenediaminetriacetic acid are also useful either as free acids or as the alkali metal and amine salts thereof.

Inorganic acids, such as nitric acid and sulfuric acid, which have been used in the past to dissolve magnesium metal in the chemical milling operation, suffer from the need for very careful handling during their use. This is due to their highly corrosive nature both in regard to the equipment used in handling them and to the personnel involved in the operation.

Surprisingly, it has now been found that the organic chelating agents of the polyaminepolyacetic acid type are excellent chemical milling agents for magnesium. These organic chelating agents, such as EDTA, DTPA, HEEDTA, etc., not only are far less corrosive to equipment and personnel, but also make control of the milling operation simpler and safer. The speed and depth of milling can be controlled very simply and easily by choosing the appropriate organic chelating agent having the desired pH in aqueous solution. Thus, EDTA has a higher capacity for dissolving magnesium at initial pH 6.0 than it does at pH 9.5. At pH 6.0, e.g. EDTA dissolves close to 80% of the theoretical amount of magnesium possible. The pH of the solution may be controlled by the addition of the appropriate salt or salts of the chelating agent alone, or in any combination with or without the free acid, or by addition of the free acid alone. For example, at room temperature in aqueous solution the free acid (EDTA) has a pH of 2.2; the monosodium salt has a pH of 3.5, the disodium salt has a pH of 4.7; the trisodium salt has a pH of 8.4 and the tetrasodium salt has a pH of 10.6. Moreover, the diammonium salt of EDTA has a pH of 3.9, while the tetrammonium salt has a pH of 8.7 in aqueous solution.

It is an object of this invention to provide a composition for chemically milling magnesium which comprises an aqueous solution of from about 0.1 weight percent to about 20 weight percent, preferably about 10 weight percent of an organic chelating agent selected from the group consisting of ethylenediaminetetraacetic acid, diethylenetriaminepentaacetic acid, hydroxyethylethylenediaminetriacetic acid, cyclohexanediaminetetraacetic acid, diaminodiethylethertetraacetic acid and N-(2-hydroxycyclohexyl)-ethylenediaminetriacetic acid and their alkali metal salts and amine salts, preferably their sodium, ammonium and triethanolamine salts. It is a further object of this invention to provide a method for chemically milling magnesium, which comprises attacking, e.g. etching, the surface of magnesium metal with an aqueous solution of an organic chelating agent such as described hereinabove. Further objects of this invention will be apparent from the more detailed description set forth hereinbelow, but it is understood that such detailed description and illustrations are given merely by way of example and not by way of limitation, since various changes may be introduced into the invention without departing from the scope and spirit thereof.

The chemical milling of magnesium may be carried out at any convenient temperature. Milling agents, e.g. EDTA, are active at temperatures ranging from $-5°$ C. to $101°$ C. Preferably, the milling operation is carried out at elevated temperature, i.e. about 85–90° C. Generally, however, external heating or cooling is optional, although special problems in milling may require addition or removal of heat in order to control e.g. the speed of the milling operation or the solubility of the milling bath components.

As organic chelating agents suitable for the chemical milling of magnesium according to the present invention, any suitable derivative of EDTA or related compound, and the water soluble salts thereof, may be used. For example, the alkali metal salts of each of the organic acid chelates are useful. Thus, for example, monosodium EDTA, disodium EDTA, trisodium EDTA and tetrasodium EDTA may be used. Likewise, the potassium salts of EDTA are useful. The mono-ammonium, diammonium, triammonium and tetrammonium salts of EDTA may be used also. For the purposes of this application, the expression "alkali metal salt" includes the ammonium salts.

The amine salts of each of the organic chelates are also useful. For example, the triethanolamine salts of EDTA are useful.

Other useful compounds according to the present invention are: the mono-, di-, tri-, tetra-, penta-sodium and/or ammonium salts of DTPA; the mono-, di, tri-sodium and/or ammonium salts of HEEDTA and of N-(2-hydroxycyclohexyl)ethylenediaminetriacetic acid; the mono-, di-, tri-, tetra-sodium and/or ammonium salts of cyclohexanediaminetetraacetic acid, and of diaminodiethylethertetraacetic acid.

Unless otherwise noted, in the following examples parts are by weight, and temperature is in degrees centigrade. The relationship of weight to volume is as that of grams to cubic centimeters.

EXAMPLE 1

A chemical milling bath is prepared which contains about 10 parts of EDTA per 100 parts of aqueous solution. The temperature of the bath is maintained at about 85°–90° and one part of magnesium metal in the form of a narrow strip is immersed in the bath for about 10 minutes, the initial pH of the solution being about 6 since the EDTA is added in the form of the disodium salt. After the 10 minute immersion more than about 60% of the magnesium is milled away.

If the concentration of EDTA is varied, while the temperature and time of immersion are held constant as in the foregoing example, the loss in weight of the magnesium varies as in the table I below:

*Table 1*

| Concentration of EDTA, percent | Initial pH of Solution | Percent Weight Loss |
|---|---|---|
| 0.1 | 6.38 | 0.23 |
| 1.0 | 6.14 | 6.68 |
| 10.0 | 6.0 | 64.3 |
| 20.0 | 5.99 | 88.5 |

If in Example 1 instead of EDTA, cyclohexanediaminetetraacetic acid is used under the same conditions, then a similar quantity of magnesium is chemically milled away.

EXAMPLE 2

A chemical milling bath is prepared which contains 13 parts of disodium EDTA in 100 parts of aqueous solution, the pH of this solution being about 5. The bath is maintained at about 101° C.

After about 10 minutes immersion more than about 60% of the magnesium is milled away.

If in the foregoing example instead of maintaining the temperature at 101° C., the solution is cooled to −5° C., after 10 minutes immersion, less than about 10% of the magnesium is removed by milling.

If in the foregoing example, instead of the disodium salt of EDTA, the diammonium salt is used at 85–90° for 10 minutes, then at pH about 4, more than 95% of the magnesium is removed. When the tetrammonium salt is used, the pH being about 9, more than 91% of magnesium is removed after 10 minutes immersion at 85–90° C.

EXAMPLE 3

A chemical milling bath is prepared in exactly the same manner as described in Example 1 except that the tetrasodium salt of EDTA is employed to produce about a 10 percent aqueous solution of EDTA. In this case, the initial pH is about 10 and after about 10 minutes immersion in the bath only about 10% of the magnesium is removed by chemical milling.

EXAMPLE 4

A chemical milling bath is prepared which contains about 10 parts of DTPA per 100 parts of aqueous solution. The temperature of the bath is maintained at about 85–90° and 1 part of magnesium metal in strip form is immersed in the bath, the initial pH of the solution being about 6.0. After 10 minutes about 80% of the magnesium is chemically milled away.

If the milling is carried out at about 25° C., the removal of magnesium proceeds more slowly and less than 80% is removed in 10 minutes.

If, instead of DTPA, N-(2-hydroxycyclohexyl)-ethylenediaminetriacetic acid is used under the same conditions, then a similar quantity of magnesium is milled away.

EXAMPLE 5

A chemical milling bath is prepared which contains about 10 parts of HEEDTA per 100 parts of aqeous solution. The temperature of the bath is maintained at about 85°–90° and one part of magnesium metal in the form of a narrow strip is immersed therein for about 10 minutes, the initial pH of the solution being about 6.0. After said immersion more than 50% of the magnesium is milled away.

If, instead of HEEDTA, diaminodiethylethertetraacetic acid is used under the same conditions, then a similar quantity of magnesium is milled away.

EXAMPLE 6

A chemical milling bath is prepared which contains about 20 parts of the triethanolamine salt of EDTA per 100 parts of aqueous solution. The triethanolamine salt of EDTA is formed from about 10 parts of triethanolamine and 10 parts of EDTA.

The temperature of the bath is maintained at about 85–90° and a narrow strip of magnesium (one part) is immersed in the bath for about 10 minutes, after which more than 88% of the magnesium is milled away.

What is claimed is:

1. A method of chemically milling magnesium metal which comprises applying to the surface of the magnesium metal an aqueous solution, having a pH of 4 to 6, of from about 0.1 weight percent to about 20 weight percent of an organic chelating agent selected from the group consisting of ethylenediaminetetraacetic acid, diethylenetriaminepentaacetic acid, hydroxyethylethylenediaminetriacetic acid, cyclohexanediaminetetraacetic acid, diaminodiethylethertetraacetic acid, N-(2-hydroxycyclohexyl)-ethylenediaminetriacetic acid and their alkali metal and amine salts.

2. A method of chemically milling magnesium metal which comprises attacking the surface of magnesium metal with an aqueous solution, having a pH of 4 to 6, of from about 0.1 to about 20 weight percent ethylenediaminetetraacetic acid.

3. A method of chemically milling magnesium metal which comprises attacking the surface of magnesium metal with an aqueous solution, having a pH of 4 to 6, of from about 0.1 to about 20 weight percent diethylenetriaminepentaacetic acid.

4. A method of chemically milling magnesium metal which comprises attacking the surface of magnesium metal with an aqueous solution, having a pH of 4 to 6, of from about 0.1 to about 20 weight percent hydroxyethylenediaminetriacetic acid.

5. A method of chemically milling magnesium metal which comprises attacking the surface of magnesium metal with an aqueous solution, having a pH of 4 to 6, of from about 0.1 to about 20 weight percent cyclohexanediaminetetraacetic acid.

6. A method of chemically milling magnesium metal which comprises attacking the surface of magnesium metal with an aqueous solution, having a pH of 4 to 6, of from about 0.1 to about 20 weight percent diaminodiethylethertetraacetic acid.

7. A method of chemically milling magnesium metal which comprises attacking the surface of magnesium metal with an aqueous solution, having a pH of 4 to 6, of from about 0.1 to about 20 weight percent N-(2-hydroxycyclohexyl)-ethylenediaminetriacetic acid.

References Cited in the file of this patent

UNITED STATES PATENTS 2,739,047    Sanz _____ Mar. 20, 1956

OTHER REFERENCES

Technical Bulletin No. 2: "The Versenes," pub. by Bersworth Chemical Co., Framingham, Mass., 1951, pp. 1–5 of Section I and pp. 51–59 of Section II.

UNITED STATES PATENT OFFICE
CERTIFICATE OF CORRECTION

Patent No. 3,063,944                      November 13, 1962

Hyman W. Zussman et al.

It is hereby certified that error appears in the above numbered patent requiring correction and that the said Letters Patent should read as corrected below.

Column 4, line 33, for "hydroxy-" read -- hydroxyethyl- --.

Signed and sealed this 21st day of May 1963.

(SEAL)
test:

NEST W. SWIDER
testing Officer

DAVID L. LADD
Commissioner of Patents